May 5, 1964
E. M. FORD
3,131,602
STEERING TORQUE AMPLIFIER
Filed Nov. 16, 1961
3 Sheets-Sheet 2
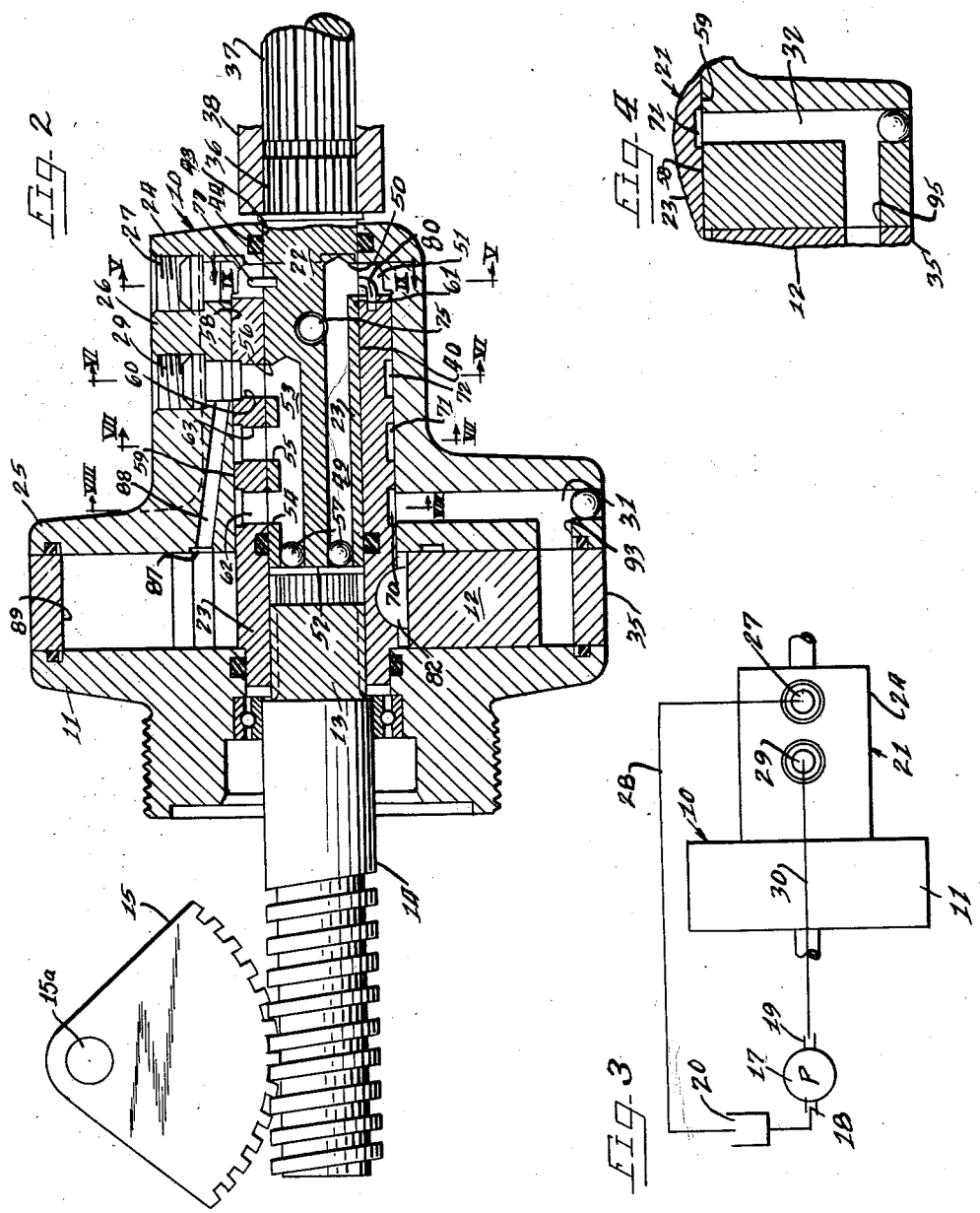
INVENTOR.
Earl M. Ford
BY
ATTORNEYS May 5, 1964  E. M. FORD  3,131,602

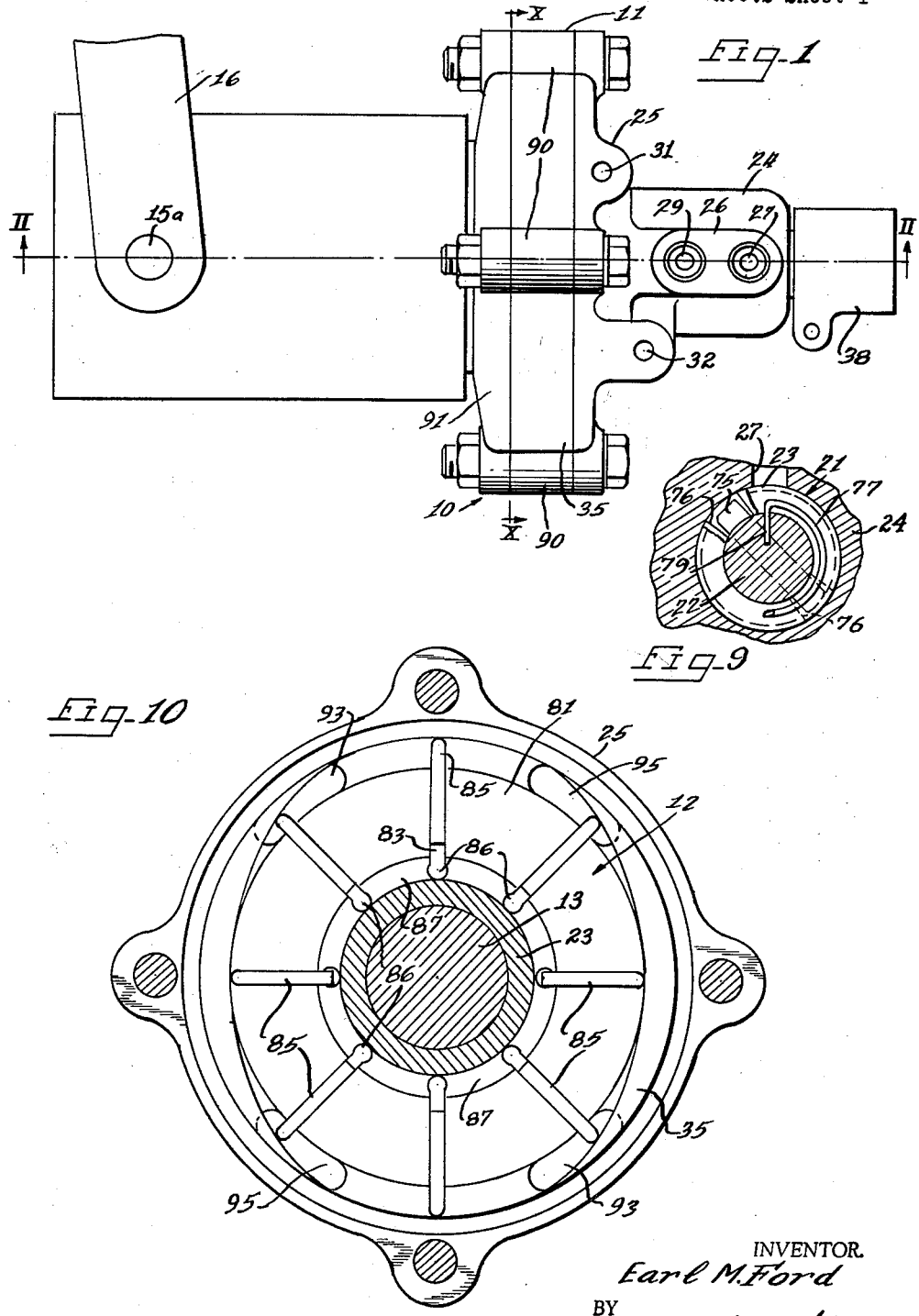

STEERING TORQUE AMPLIFIER

Filed Nov. 16, 1961  3 Sheets-Sheet 3

INVENTOR.
Earl M. Ford
BY
Hill Sherman Meroni Gross & Simpson
ATTORNEYS

United States Patent Office 3,131,602
Patented May 5, 1964

3,131,602
STEERING TORQUE AMPLIFIER
Earl M. Ford, Birmingham, Mich., assignor to Kingston Products Corporation, Kokomo, Ind., a corporation of Indiana
Filed Nov. 16, 1961, Ser. No. 152,837
3 Claims. (Cl. 91—137)

This invention relates to improvements in power steering systems and more particularly relates to an improved form of torque amplifier to assist in steering.

This application is a continuation-in-part of my application Serial No. 71,056 filed November 22, 1960, and entitled "Hydraulic Control."

A principal object of the invention is to provide a compact and efficient form of torque amplifier assisting in steering and affording full time power steering, permitting full manual steering in cases of power failure.

Another object of the invention is to provide a torque amplifier in the form of a rotary motor in which the valve for supplying fluid under pressure to the motor to effect steering is also effective to accommodate manual steering through the valve upon manual turning of the steering column.

A still further object of the invention is to provide a more efficient and compact form of power steering system utilizing a rotary fluid operated motor to effect steering, a rotary valve controlling the supply of fluid under pressure to the motor, a direct drive connection from the steering column to the valve to turn the valve to effect steering and a direct drive connection from the valve to the steering system to effect manual steering.

Still another object of the invention is to improve upon the power steering systems heretofore in use by utilizing a two-part rotary valve to control steering and directly connecting one part of the valve to a steering shaft, by rotatably driving the part of the valve connected to the steering shaft by a fluid operated motor to effect power steering and by providing limited relative motion between the two parts of the valve to effect the supply of fluid under pressure to one side or the other of the rotary motor dependent upon the direction of steering of the steering wheel, and by providing a yieldable connection between the two parts of the valve, to impart a feel of steering on the steering wheel.

These and other objects of the invention will appear from time to time as the following specification proceeds and with reference to the accompanying drawings wherein:

FIGURE 1 is a plan view of a torque amplifier constructed in accordance with the present invention showing the amplifier connected in the steering system for an automotive vehicle;

FIGURE 2 is a generally diagrammatic composite sectional view taken through the torque amplifier shown in FIGURE 1 with the housing for the steering gear removed and certain other parts broken away and showing one port for supplying fluid under pressure to the steering motor and taken substantially along line II—II of FIGURE 1;

FIGURE 3 is a fluid diagram of the power steering system, illustrating the fluid connections to the torque amplifier;

FIGURE 4 is a fragmentary detail sectional view drawn to the same scale as FIGURE 2 and taken substantially along line IV—IV of FIGURE 2 and illustrating a second port for supplying fluid under pressure to the steering motor;

Figure 5:
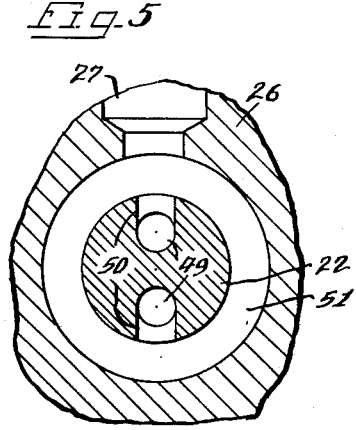
FIGURES 5, 6, 7 and 8 are each cross-sectional views taken respectively substantially along the planes of lines V—V, VI—VI, VII—VII and VIII—VIII of FIGURE 2 and showing the valve in its open center position.
Figure 6:
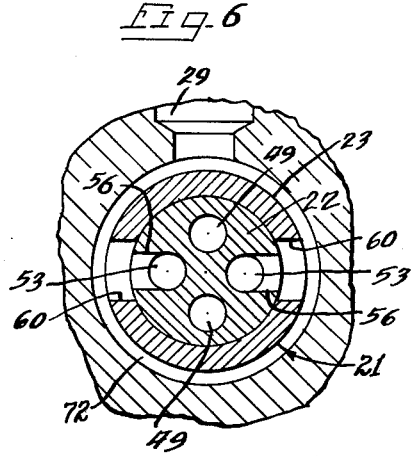

FIGURE 9 is a fragmentary sectional view taken through one end of the valve substantially along lines IX—IX of FIGURE 1, illustrating the connection between the parts of the valve to accommodate limited movement of one part of the valve relative to the other, and showing the torsion spring providing a feel of steering; and FIGURE 10 is a view of the fluid operated steering motor looking substantially along lines X—X of FIGURE 1.

In the embodiment of the invention illustrated in the drawings, I have shown in FIGURES 1, 2 and 3 a torque amplifier 10 including a housing 11 having a rotor 12 rotatably mounted therein, and having an end cover 25 having a valve housing part 24 extending therefrom concentric with the axis of rotation of the rotor 12.

The valve housing part 24 is generally cylindrical in form and has a boss portion 26 projecting therefrom and extending along one side thereof having two separate ports 27 and 29 leading thereinto.

In FIGURE 3, I have diagrammatically shown a pump 17 having an inlet 18 and an outlet 19. The inlet 18 of the pump 17 is connected to a reservoir shown at 20. The outlet 19 is connected with the port 29 to supply fluid under pressure to said port through a conduit 30. A conduit 28 connects the port 27 with the reservoir 20 for returning fluid thereto to be circulated through the system under pressure, by the pump 17.

The port 29 thus serves as a pressure port supplying fluid under pressure to a valve 21 rotatably mounted within the valve housing port 24, while the port 27 serves as a return port returning fluid from the rotor 12 through the valve 21 to the reservoir 20.

The rotary valve 21 comprises an input part 22, an output part 23 concentric with and extending along said input part and rotatably mounted within the valve housing 24 and having the rotor 12 keyed or otherwise secured thereto.

As shown in FIGURE 2, a splined end portion 13 of a worm shaft 14 extends within an open end portion of the output part 23 and is splined thereto. The worm shaft 14 is shown as meshing with a worm sector 15 on a shaft 15a for turning said shaft. A steering pitman arm 16 is suitably secured to the shaft 15a and turned thereby upon turning movement of the rotor 12 and output part 23 under the control of the valve 21. The steering gear is thus shown as a worm and sector type of steering gear, but may be of any conventional form desired.

The end wall 25 of the housing 11 has two diametrically opposed first ports 31 extending diametrically therealong and having communication with the inner periphery of a cam ring 35 for the rotor 12. The end wall 25 also has two diametrically opposed second ports 32 spaced circumferentially from the ports 31 and also leading to the inner periphery of the cam ring 35.

The first ports 31 may be pressure ports and the second ports 32 may be return ports and vice versa, depending upon the direction of rotation of the rotor 12.

The input part 22 of the valve 21 has a splined end portion 36 projecting outwardly of the valve housing portion 24 and connected to the adjacent end of an axially aligned steering column 37 by means of a coupling collar 38. Turning of the steering column 37 will thus turn the valve 21 within the valve housing part 24.

The input part 22 of the valve 21 is in the form of a spool-like member having a smooth cylindrical outer peripheral surface 40 extending for the length thereof, and through a throat 43 of the housing part 24, and sealed to said throat as by an O-ring seal 44.

The input part 22 has formed therein an axially extending passage 49 spaced radially from the axis of rotation of said input part and having a radial opening 50 interesecting the peripheral surface 40 and registering with an annular recess 51 in the valve housing part 24 adjacent the throat 43. The annular recess 51 in turn has communication with the return port 27 in all positions of rotation of the input part 22 with respect to the valve housing part 24. The passage 49 may be conveniently formed in the input part 22 by drilling through one end of the input part shown as 52, the end 52 terminating short of the adjacent end of the worm shaft 14.

The input part 22 is further formed with a second axially extending passage 53 which may likewise be formed by drilling into the end face 52. The passage 53 has three axially or longitudinally spaced openings leading radially therefrom including a first opening 54, a second opening 55 and a third opening 56, all of which intersect the outer peripheral surface 40 of the input part 22. After the passages 49 and 53 are formed, the ends thereof adjacent the end face 52 may be closed by means of plugs 57.

As shown in FIGURES 5 to 8, the passages 49 and 53 may be duplicated in diametral symmetry in the input part 22 and in view of such relationship, like reference numerals have been applied to functionally corresponding portions of the parts illustrated on the drawings.

The housing part 24 is formed with a cylindrical bore having a bore wall 58 of larger diameter than the outer peripheral surface 40 of the input part 22, thereby to receive in interposed relation a sleeve-like valve portion 59 formed integral with the output part 23. Thus, the outer peripheral surface of the sleeve-like valve portion 59 of the output part 23 has bearing engagement with the wall 58, and the inner peripheral surface of said sleeve-like valve portion has bearing engagement with the outer peripheral surface 40 of the input part 22.

At opposite diametral points in the sleeve-like valve portion 59 and in registry with the openings 54, the output part 23 is formed with radially extending openings 62. Likewise, at opposite diametral points and in registry with the openings 55, the output part 23 is formed with radially extending openings 63. The sleeve-like valve portion also has diametrically opposed radially extending openings 60 in registry with the openings 56 and registrable with the pressure port 29, supplying fluid under pressure to the passageway 53 extending along the input part 22.

Figure 7:
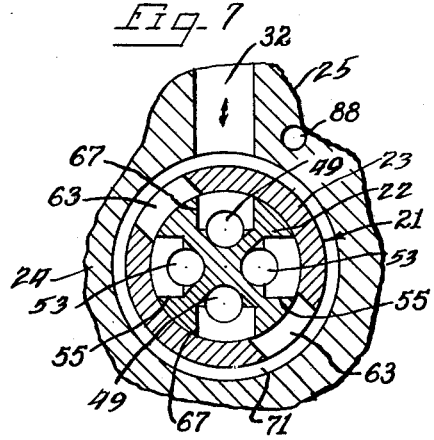
Figure 8:
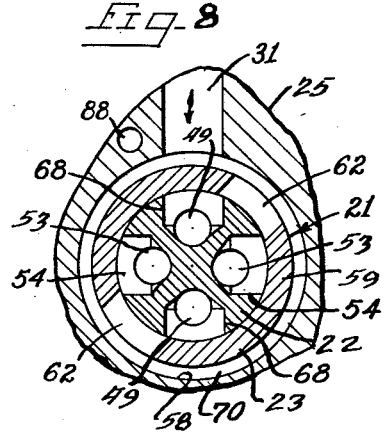

In FIGURE 8 the input part 22 is shown as being formed with radially extending openings 67 communicating with the passages 49 and opening through the peripheral surface 40 in axial registry with the openings 63 in the sleeve-like valve portion 59. Similar radially extending openings 68 lead from the passages 49 and have registry with the openings 62 leading through the sleeve-like valve portion 59 (FIGURE 7).

To improve communication between the ports 29, 31 and 32 and the respective radial openings 60, 63 and 62, the outer peripheral surface of the sleeve-like valve portion 59 is provided with an annular recess 70 in communication with the opening 62, an annular recess 71 in communication with the opening 63 and an annular recess 72 in communication with the opening 60.

In FIGURES 2 and 9, I have shown a dowel pin 75 connecting the output part 23 to be rotated by the input part 22 and accommodating limited freedom of movement between said output and input parts. The dowel pin 75 may be press fitted in the input part 22 and extends radially from opposite sides thereof through openings 76 leading diametrically through the sleeve-like valve portion 59 of the output part 23. The openings 76 are angularly drilled along opposite sides of a common centerline for said openings to provide clearance between the ends of the dowel pin 75 and said openings, and to thereby accommodate limited relative angular movement between the output and input parts to accommodate movement of the valve past its overcenter position to supply fluid under pressure through either of the passages 62 or 63.

A torsion spring 77 is also connected between the input part 22 and the output part 23 to introduce so-called road feel in the system. As shown in FIGURES 2 and 9, the torsion spring 77 has a radial end portion 79 extending within and connected to the input part 22 and has an opposite axially extending end portion 80 extending within and secured to the output part 23. By selecting the rate of the spring 77, the amount of "road feel" can be selectively varied. For example, good results have been attained through the use of torsion spring 77 producing a torque of approximately 18 inch pounds for 2½° of angular movement between the input part 22 and the output part 23 beyond the longitudinal center of the dowel pin 75.

Referring now in particular to FIGURES 1, 2 and 10 and the power steering motor, said motor is shown as being of a well known form of sliding vane type of motor in which the rotor 12 of the motor comprises a disk 81 keyed to the output part 23 by a key 82 and having a plurality of radially extending slots 83 formed therein and opening to the periphery thereof. The slots 83 have vanes 85 slidably mounted therein and terminate at their inner end portions into enlarged pressure portions 86 having communication with an annular recess 87 concentric with the axis of rotation of the rotor 12 and formed in the inner side of the end wall 25 for the housing.

A passageway 88 leads from the pressure port 29 to the annular recess 87 to supply fluid under pressure to the pressure portions 86 of the slots 83 and to thereby bias the vanes 85 into engagement with a camming face 89 of the cam ring 35.

The cam ring 35 forms an intermediate part of the housing 11 and is provided with outwardly extending lugs 90 affording a means to accommodate said camming ring to be bolted between the end wall 25 of the housing 11 and an opposite end wall 91 of said housing.

As shown in FIGURES 2 and 10, the passageways or first ports 31 open to the interior of the housing 11 through elongated ports 93 extending along the outer surface of the disk 81 of the rotor 12. In a like manner, the second ports or passageways 32 open into elongated ports 95 spaced 90° from the ports 93 between said ports. Thus, when it is desired that the motor rotate in one direction, fluid under pressure will be admitted through the ports 93 and exhausted out through the ports 95 and vice versa, when the direction of rotation of the rotor is reversed.

In considering the operation of steering, it should be understood that the valve 21 is shown in FIGURES 2, 5, 6, 7 and 8 in its open center position. In this position of the valve, fluid under pressure flows from the pump 17 through the pressure port 29 and passages 53 and is returned to the reservoir 20 through the openings 62, 68 and the openings 63, 67 to the passages 49 and along the annular passage 51 out through the valve housing through the port 27.

As the steering column 37 is turned by operation of the steering wheel (not shown), for example, to angularly move the input part 22 in a clockwise direction, the input part 22 will move relative to the output part 23 and move the pressure ports or openings 54 into the openings 62 and will move the return openings 68 into the spaces between the openings 62 and will thereby block the return openings 68. Fluid under pressure will then pass through the passageways 53 and openings 54 and 62 to the ports 31 and 93 and will be released through the ports 95. Movement of the input part 22 relative to the output part 23 to connect the port 29 to the pressure passageways 53 will also move the openings 67 into registry with the openings 63 and will move the pressure openings 55 into the spaces between the openings 63. Fluid will then be returned through the ports 95, the ports 32 and the openings 63 and 67 to the return passages 49. This will accommodate fluid under pressure to pass into the pumping chamber through the ports 93 and be exhausted through the ports 95 and turn the rotor and pitman 16 through the worm 14 and worm gear sector 15 to steer the vehicle. Turning of the rotor 12 and pitman 16 will continue as long as pressure is exerted on the steering wheel in a clockwise direction to keep the passages 54 open and the passages 68 closed. When turning of the steering wheel is stopped, the pressure on the rotor 12 will move the output part 23 relative to the input part 22 and will return the valve to its open center position. Pressure on the steering wheel to turn the input part 22 will assure the supply of fluid under pressure to the rotor 15, until turning pressure on the steering wheel is stopped, at which time the valve 21 will be moved to its open center position, by overriding of the valve.

Upon turning of the steering column 37 and input part 22 in a counterclockwise direction, the pressure ports 55 will be moved into the openings 63 and the openings 54 will be moved into space between the openings 62. The direction of the flow of fluid under pressure will be reversed and pressure will then be applied to reverse the direction of rotation of the rotor 12, through the ports 32 and 95. Fluid will at the same time be returned to the storage reservoir 20 through the ports 93 and 31 and the openings 62 and 68 and out through the return port 27 through the return passages 49 leading along the valve body.

It may be seen from the foregoing that a simplified form of power steering system and torque amplifier has been provided in which the torque amplifier and valve are a unitary part, and in which the output part of the valve is rotatably driven by the steering motor and has direct connection with the steering worm and worm sector for turning the pitman.

It may further be seen that the torque amplifier and control valve therefore are of a simple and compact construction and require a minimum amount of space in the vehicle, and that positive manual steering may be attained by the simple operation of turning the input and output parts of the valve and torque amplifier, by turning movement of the steering wheel.

It may further be seen that the rotor 12 is operated on a pressure differential and that the activating force for steering is away from the linkage and at the input side of the steering gear box and that if the hydraulic system should fail, steering is available ahead of the multiplication, and the vehicle may be steered manually as in a manually steered automotive vehicle.

While I have herein shown and described one form in which my invention may be embodied, it may readily be understood that various modifications and variations in the invention may be attained without departing from the spirit and scope of the novel concepts thereof, as defined by the claims appended hereto.

I claim as my invention:
1. In a torque amplifier,
(a) a housing having
(b) a valve chamber therein,
(c) a rotary valve rotatably mounted within said valve chamber, and including
(d) an input part,
(e) an output part coaxial with and relatively movable with respect to said input part,
(f) a rotary fluid operated motor within said housing and including
(g) a rotor having drive connection with said output part,
(h) fluid pressure and return connections leading into said housing and valve chamber,
(i) fluid pressure passageways in said housing leading from said valve chamber to said motor for supplying fluid under pressure to said motor upon operation of said valve,
(j) means turning said input part relative to said output part to effect the supply and release of fluid under pressure to said motor to effect turning movement of said output part by power,
(k) a pin mounted in said input part and extending radially therefrom,
(l) a slot in said output part receiving said pin and circumferentially enlarged to accommodate movement of said pin with respect to said slot, and limiting relative movement between said input and said output parts and forming a positive drive connection between said input and said output parts,
(m) and a torsion spring extending along the outside of said input part and connected thereto at one end and connected to said output part at its opposite end to impart a feel of steering.
2. In a torque amplifier,
(a) a housing having
(b) a rotor having a plurality of radially extending sliding vanes, said rotor being rotatably mounted within said housing,
(c) an inlet into said housing,
(d) an outlet from said housing,
(e) a fluid pressure biasing passageway leading from said inlet along said housing and having communication with the inner ends of said sliding vanes for biasing said vanes outwardly by inlet pressure,
(f) a valve chamber in said housing,
(g) a valve rotatably mounted within said valve chamber and including,
(h) an input part,
(i) an output part extending along said input part and relatively movable with respect to said input part,
(j) fluid passageways leading from said inlet and said outlet into said valve chamber,
(k) fluid pressure passageways in said housing separate from said biasing passageway and leading from said valve chamber to said rotor for supplying fluid under pressure to said rotor under the control of said valve,
(l) means turning said input part relative to said output part to effect the supply and release of fluid under pressure to said motor and to thereby effect the turning of said rotor and of said output part by power,
(m) a pin mounted in said input part and extending radially outwardly therefrom,
(n) a circumferentially elongated slot in said output part registering with said pin and cooperating with said pin to limit relative movement between said input and said output parts and to manually turn said output part upon manual turning movement of said input part to effect a positive manual rotatable drive connection between said input and said output parts,
(o) and a torsion spring connected between said input and said output parts.
3. In a torque amplifier,
(a) a housing having
(b) a valve chamber therein,
(c) a rotary valve rotatably mounted within said valve chamber and including
(d) an input part,
(e) an output part extending along said input part and rotatable with respect to said input part,
(f) fluid pressure and return connections leading into said housing and valve chamber,
(g) a rotary fluid operated motor within said housing and including
(h) a disk secured to and having drive connection with said output part and having a plurality of radial slots therein,
(i) sliding vanes slidable in said slots,
(j) said housing having an internal camming face engaged by the ends of said vanes and having
(k) pressure and return ports leading to and from said vanes on the outside of said disk,

(*l*) fluid pressure and return passageways leading from said valve chamber and having fluid communication with said ports, (*m*) means turning said input part relative to said output part to effect the supply and release of fluid under pressure to said motor to turn said output part by power, (*n*) means limiting relative movement between said input and said output parts and positively turning said output part upon manual turning movement of said input part, (*o*) a torsion spring extending partially about said input part and connected between said input and output parts, (*p*) and passageway means leading from said fluid pressure connection into said housing along said housing in outwardly spaced relation with respect to said ouput part and having communication with said slots in said disk for supplying fluid under pressure thereto to bias said vanes outwardly with respect to said disk.

References Cited in the file of this patent

UNITED STATES PATENTS

| | | |
|---|---|---|
| 1,810,176 | Hott | June 16, 1931 |
| 1,947,991 | Jessup | Feb. 20, 1934 |
| 2,138,050 | Vickers | Nov. 29, 1938 |
| 2,579,711 | Staude | Dec. 25, 1951 |
| 2,613,649 | Diebel | Oct. 14, 1952 |
| 2,930,359 | McDuff | Mar. 29, 1960 |
| 2,984,215 | Charlson | May 16, 1961 |
| 2,988,059 | Wysung | June 13, 1961 |